Aug. 24, 1926.
A. B. GARMAN
1,597,187
ELECTRIC COOKING APPARATUS
Filed Nov. 30, 1925  2 Sheets-Sheet 1
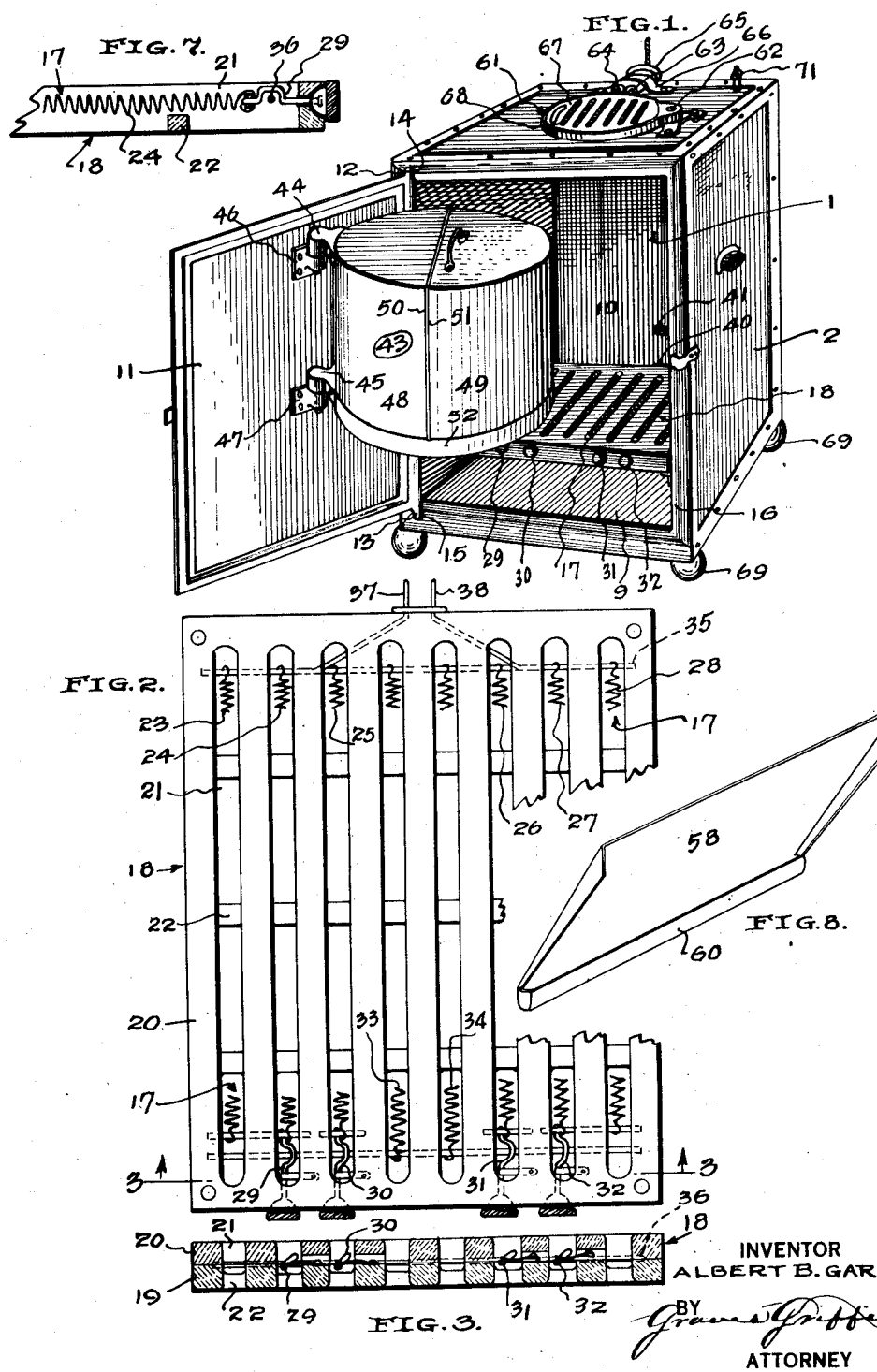
INVENTOR
ALBERT B. GARMAN.
BY
ATTORNEY Aug. 24, 1926.
A. B. GARMAN
1,597,187
ELECTRIC COOKING APPARATUS
Filed Nov. 30, 1925    2 Sheets-Sheet 2
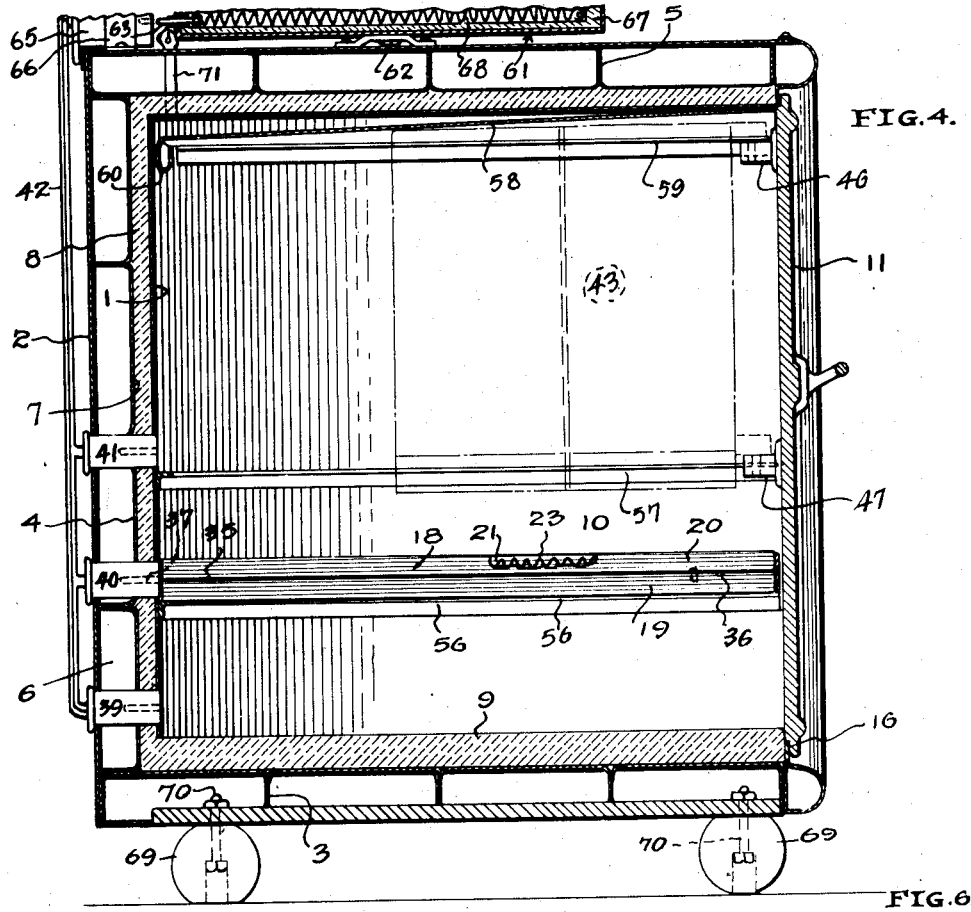
FIG. 4.
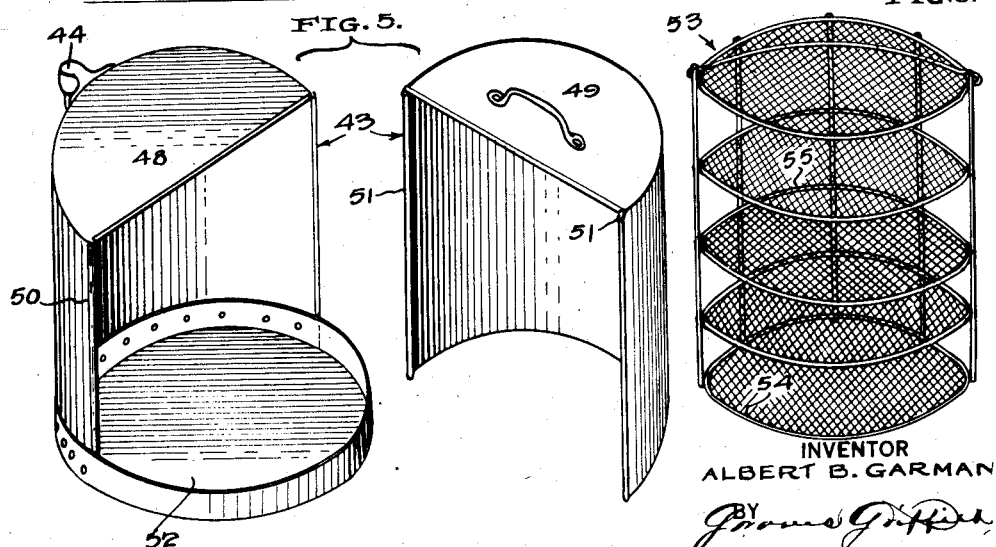
FIG. 5.
FIG. 6.
INVENTOR
ALBERT B. GARMAN
ATTORNEY Patented Aug. 24, 1926.

1,597,187

UNITED STATES PATENT OFFICE.

ALBERT B. GARMAN, OF SAN FRANCISCO, CALIFORNIA.

ELECTRIC COOKING APPARATUS.

Application filed November 30, 1925. Serial No. 72,081.

This invention relates to improvements in electric cooking apparatus, and more particularly to electric cookers of the portable type having heat-insulated ovens and movable heat-absorbing electric heating-elements.

The present invention covers improvements and refinements of construction in the type of portable electric ovens shown and described in my two co-pending applications, Serial No. 686,433, filed January 15, 1924, and Serial No. 714,298, filed May 16, 1924.

The primary object of the invention is the provision of an electric cooker having a heat insulated oven adapted to prevent heat radiation and, when brought to the proper heating or cooking temperature by the heating-element, to retain this temperature with a minimum consumption of electric current.

Another object is the provision of an electric cooker provided with heating-elements, borne by a heat-absorbing non-conductor of electro-current body, adapted to be moved to different levels and to make, automatically, electric contacts upon proper placement of said body upon a particular level.

A further object of the invention is to provide, in a device of the character designated, a removable auxiliary cooker adapted for convenient and ready attachment to and detachment from the oven door and so arranged as to swing into and out of the oven as the door is closed or opened and providing a suitable independent receptacle for bearing conveniently divers articles of food to be cooked, which, as an auxiliary cooker, may, after completion of the cooking, be detached from the oven door, with contents intact, as a preliminary to serving the food.

An additional object is the provision of a heat-absorbing body constituted of a non-conductive refractory material, such as cement or come diatomaceous preparation, which, when thoroughly heated by the electric heating-elements, will continue to radiate heat sufficient to complete the cooking, after the manner of the "fireless cooker", or that may have varying degrees of heat imparted thereto through varying the number of heating-elements to be energized.

Additional to the foregoing is the provision of an independent heating-element borne by the oven exteriorly and of similar construction to that of the oven heating-elements and adapted for use as a means for hasty coffee making.

Other objects and advantages will appear with reference to the subjoined specification and two sheets of drawings, in which:

Figure 1 is a perspective view, showing my electric cooker with its door swung open and bearing hinged on its interior surface the auxiliary cooker in place for service, the electric heating-elements in place therewithin, and the independent heating-element carried exteriorly thereby;

Figure 2 is a plan view of the heating elements, showing the method of placing the coils in elongated slots formed in the heat-absorbing body, the method of connecting the coils into selective units, and the switches controlling their selective or collective operation;

Figure 3 is a transverse section taken through the heat-absorbing body, showing the slotted formation of this body to provide coil housings, the section being taken on the line 3—3 of Figure 2;

Figure 4 is a vertical sectional view of the cooker, showing, in general, the constructional details, the door being shown closed, the auxiliary cooker indicated by dot-and-dash lines, and the heating-elements connected for use;

Figure 5 is a perspective view of the removable auxiliary cooker, shown as detached from the oven door for clearness of illustration;

Figure 6 is a perspective view of the wire rack, which fits within the auxiliary cooker and is adapted to hold a plurality of cooking utensils in spaced relationship;

Figure 7 is a sectional detail of a portion of the heat-absorbing body, showing one of the coils in place and one of the selective switches in open position; and Figure 8 is a perspective view of the condenser, which fits in the upper part of the oven and is adapted to carry off such products of condensation as may accumulate thereon.

Referring more particularly to the drawings, my invention comprises an inner casing 1, preferably formed of sheet aluminum, and an outer casing 2, of like material but somewhat larger in size than the inner one and evenly spaced therefrom at top, bottom and sides, the spaces thus formed between the two casings being approximately equally divided by sheets of metal bent to form ribbed spacing members 3, 4 and 5, which are inserted from one side of the cooker before the side plates are secured in place— the said spacing members being arranged horizontally within the outer casing 2, at top, bottom, back and sides, forming a plurality of dead-air chambers 6, completely surrounding the inner casing 1 except at the front side. The space 7 between the inner casing 1 and the spacing members 3, 4 and 5 is filled with cement, or like material to form a heat-insulating shell 8 of uniform thickness of wall, except the bottom 9, which is somewhat thicker than the side walls and top, as shown in Figure 4. The whole, as thus formed, constitutes a cooking chamber 10, having a cast door 11 closing its front side, the door being hinged to the cooker by means of integrally formed lugs 12 and 13 inserted in notches 14 and 15 formed in the upper and lower corners of the door-frame 16.

The electric heating-elements 17 are formed of coils of michrome wire and are housed within the heat-absorbing body 18, as shown in Figure 2. The body 18 comprises, preferably, two sections of cement, or the like, 19 and 20, each cast in a mold and having a plurality of elongated slots 21 extending longitudinally of the body 18, the lower section 19 being reinforced by a plurality of connecting ribs 22, the said slots and ribs 22 being adapted to house and support the heating-elements 17 in spaced relation to each other, as shown in Figures 2 and 3, the coils being held in place by means of a plurality of rods centrally secured between the body sections 19 and 20. The heating-elements 23—24, 25, 26 and 27—28 are selectively controlled, either in pairs as 23—24 and 27—28, or singly as 25 and 26, or in such combinations with the central pair 33—34 as may be desired, by means of crank-switches 29, 30, 31 and 32. The centrally positioned non-selective elements 33 and 34 are connected to the rods 35 and 36 and are always being energized when the terminals 37 and 38 are inserted in any one of the sockets 39, 40 and 41. A maximum degree of heat may be attained in the cooking chamber 10 by cutting in all the coils 23, 24, 25, 26, 27, 28, 33 and 34, and, as desired, after the proper degree of heat for cooking purposes has been reached, these coils, excepting 33 and 34, may be de-energized successively or collectively by cutting out the heating units comprised of these coils, through the actuation of the switches 29, 30, 31 and 32, the coils 33 and 34 continuing to be energized until the terminals 37 and 38 have been removed from the plugs, or until the main source of electrical supply 42 has been cut off by the manipulation of a switch in the circuit (not shown).

The auxiliary cooker 43 is hingedly secured to the inner surface of the door 11 by means of brackets 44 and 45 bearing hinge pintles adapted for insertion into bearing brackets 46 and 47 riveted centrally of the door, the said cooker comprising semi-cylindrical sections 48 and 49 having hooked edges 50 and 51 adapted to interlock, the section 49 being slidable vertically relative to the section 48, to give access to the cooker proper. The section 48 is provided with a flanged bottom 52 adapted for the support of a wire frame 53 having a bottom support 54 and a plurality of utensil-retaining supports 55. The auxiliary cooker, as thus constituted, may be filled with articles of food to be cooked and swung into the oven above the heat-absorbing body 18 bearing the heating-elements, as shown in dot-and-dash position, Figure 4.

The body 18 may rest upon the bottom 9 of the cooking chamber 10, with the terminals 37 and 38 plugged into the socket 39; or it may be raised to the position shown in Figure 4 and rest upon the angle-iron brackets 56, with the terminals plugged into the socket 40; or it may be raised to the top level and rest upon the angle-iron brackets 57, with the terminals plugged into the socket 41.

A condenser hood 58 having flanges is supported near the top of the chamber 10 by angle-iron brackets 59, the flanges being borne by the sides of said hood and tapering in the direction of the rear of the cooker chamber 10 to give the proper inclination to the hood to facilitate drainage, the hood being further provided with a gutter 60, for carrying off such condensations as may accumulate upon the upper surface of said hood.

An independent heating-element 61 is pivotally secured to the top side of the outer casing of the cooker, as indicated at 62, the terminals 63 and 64 being arcuately arranged to conform to the pivotal point 62 and adapted to make contact with the plug 65 rigidly mounted in position upon the oven top by means of a clip, or like fastener, 66. The element 61 is of construction similar to that of the heat-absorbing body 18, except that the cement or diatomaceous material 67 bearing the heating coils 68 is enclosed in a suitable metal frame of circular or oval form, with the heating coils all connected into the circuit, none of the coils being adapted for selective operation.

The element 61 is independently energized and operated relative to the heating elements confined within the cooker chamber 10, the provision of this element being solely as an additional and outside heating unit for convenience in hurriedly making coffee or heating water.

The cooker chamber 10 is provided with a valve-controlled vent 71, as a means for drainage of condensation and, also, for the release of excessive pressure due to expansion of confined vapors.

The main oven body is supported by means of four spherical supports 69 placed under the corners of the frame and secured thereto by means of bolts 70.

The heating coils are preferably formed of 22/1000 michrome wire coiled about a $\frac{5}{32}$ core, and cut in sections equal to $\frac{2}{3}$ of their required length, these sections being drawn out to the full required length.

Having thus described my invention, I claim, and desire to secure by Letters Patent:

1. In an electric cooker, the combination with a heat-insulated oven consisting of an inner and an outer casing having interposed therebetween spacing members and a cement filler, of a heat-absorbing body of non-conductive refractory material molded in sections and bearing a plurality of slots, a plurality of electric heating coils housed in said slots and arranged as selective and non-selective units, an electrical circuit for said units slip-sockets mounted in said oven at varying levels, slip-plugs connecting said units and adapted for insertion in said slip-sockets to close the circuit in said non-selective units, and rotatable contacts for cutting in and cutting out any number or all of said selective units.

2. In an electric cooker, the combination with a heat-insulated oven consisting of an inner and an outer casing having interposed therebetween spacing members and a cement filler, of a removable heat-absorbing body of non-conductive refractory material and of sectional construction, a plurality of slots formed in said sections and adapted to house a plurality of electric heating coils arranged in selective and non-selective units, an electrical circuit for said units, means for making slip contacts between said circuit and said coils to close the circuit in said non-selective heating coils, and rotatable contacts connected in said circuit and adapted to selectively or collectively energize said selective units.

3. In an electric cooking apparatus, the combination with a heat-insulated oven consisting of an inner and an outer casing having interposed therebetween horizontally disposed spacing members and a cement filler between said spacing members and said inner casing, of a removable heat-absorbing body of non-conductive refractory material molded into complementary sections bearing a plurality of slots, a plurality of electric heating coils housed in said slots and arranged in selective and non-selective units, an electric circuit for said coils, slip connections between said heat-insulated oven and the removable heat-absorbing body adapted for the energization of the non-selective heating coils at all times when contact is made, and switches bearing rotatable make-and-break contacts connected in said circuit and adapted through manual actuation to selectively energize or de-energize certain or all of said selective units.

In testimony whereof I have affixed my signature.

ALBERT B. GARMAN.